United States Patent
Tsukiyoshi et al.

(10) Patent No.: US 12,442,480 B2
(45) Date of Patent: Oct. 14, 2025

(54) LONG OBJECT GUIDING DEVICE AND TUBULAR MEMBER

(71) Applicant: TSUBAKIMOTO CHAIN CO., Osaka (JP)

(72) Inventors: Keiichi Tsukiyoshi, Osaka (JP); Masashi Kunii, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 155 days.

(21) Appl. No.: 18/275,937

(22) PCT Filed: Feb. 7, 2022

(86) PCT No.: PCT/JP2022/004745
§ 371 (c)(1),
(2) Date: Aug. 4, 2023

(87) PCT Pub. No.: WO2022/176683
PCT Pub. Date: Aug. 25, 2022

(65) Prior Publication Data
US 2024/0102597 A1  Mar. 28, 2024

(30) Foreign Application Priority Data
Feb. 16, 2021  (JP) .................................. 2021-022755

(51) Int. Cl.
*F16L 57/00*  (2006.01)
(52) U.S. Cl.
CPC .................................. *F16L 57/00* (2013.01)
(58) Field of Classification Search
CPC ...................................................... F16L 57/00
See application file for complete search history.

(56) References Cited

U.S. PATENT DOCUMENTS 4,218,814 A * 8/1980 Hodapp .............. B29C 66/4322
                                                   138/167
4,601,418 A * 7/1986 Gruzensky .............. A45C 1/04
                                                   D3/226
(Continued)

FOREIGN PATENT DOCUMENTS

JP      S58-7383 U      1/1983
JP      2000-184552 A   6/2000
(Continued)

OTHER PUBLICATIONS

International Search Report dated Apr. 26, 2022, issued in counterpart International application No. PCT/JP2022/004745, with English translation. (5 pages).
(Continued)

*Primary Examiner* — Krystal Robinson
(74) *Attorney, Agent, or Firm* — WHDA, LLP

(57) ABSTRACT

A long object guiding device includes a long tubular member and is configured to guide a long object inserted through the tubular member while protecting, with the tubular member, the long object in correspondence with displacement of the tubular member. The tubular member has a long sheet shape in an unfolded state. A longitudinal direction of the tubular member intersects a width direction. A first joint portion is disposed on one side edge of the tubular member in the width direction to extend in the longitudinal direction. A second joint portion is disposed on an other side edge of the tubular member in the width direction to extend in the longitudinal direction. At least one end of the tubular member, in the longitudinal direction, has a passage portion that allows for passage of an end of the long object.

6 Claims, 6 Drawing Sheets

(56) References Cited

U.S. PATENT DOCUMENTS

| | | | | |
|---|---|---|---|---|
| 4,944,976 | A | * | 7/1990 | Plummer, III ....... H02G 3/0481 |
| | | | | 178/92 |
| 5,535,787 | A | * | 7/1996 | Howell ................ H02G 3/0487 |
| | | | | 248/205.2 |
| 8,859,898 | B2 | * | 10/2014 | Frye ..................... H02G 3/0481 |
| | | | | 174/99 R |
| 8,957,310 | B2 | * | 2/2015 | Kaihotsu .................. H02G 3/04 |
| | | | | 138/155 |
| 2003/0178086 | A1 | * | 9/2003 | Hu ......................... F16L 59/10 |
| | | | | 138/167 |
| 2011/0100671 | A1 | * | 5/2011 | Seraj ........................ H02G 1/14 |
| | | | | 29/592 |
| 2012/0056143 | A1 | | 3/2012 | James |
| 2014/0076604 | A1 | * | 3/2014 | Frye ..................... H02G 3/0481 |
| | | | | 174/68.3 |
| 2016/0315457 | A1 | * | 10/2016 | Winer ...................... H02G 7/00 |
| 2018/0010716 | A1 | * | 1/2018 | Grossman ............... F16L 11/12 |
| 2019/0338882 | A1 | * | 11/2019 | Fukuda ................ H02G 3/0481 |

FOREIGN PATENT DOCUMENTS

| | | |
|---|---|---|
| JP | 2018-90290 A | 6/2018 |
| KR | 10-2012-0024498 A | 3/2012 |

OTHER PUBLICATIONS

Office Action dated Aug. 6, 2025, issued in counterpart KR Application No. 10-2023-7030761, with English translation. (19 pages).

\* cited by examiner

LONG OBJECT GUIDING DEVICE AND TUBULAR MEMBER

TECHNICAL FIELD

The present disclosure relates to a long object guiding device that guides a flexible long object that, for example, supplies power to a movable unit included in a machine tool or the like in correspondence with movement of the movable unit while protecting the long object by inserting the long object into a flexible tubular member, and to a tubular member in the device.

BACKGROUND ART

Patent Literature 1 discloses an example of a binding protective member that is conventionally known as a tubular member used in the above type of a long object guiding device. The binding protective member has a flexible long sheet-like protective cover. One side edge and the other side edge of the protective cover are respectively provided with a male mount portion and a female mount portion in a longitudinal direction of the protective cover. When the protective cover is wound around wires, which are long objects, the binding protective member becomes tubular. Further, the male mount portion and the female mount portion, which circumferentially face each other, are fitted together over the entire protection cover in the longitudinal direction. As a result, the tubular member that accommodates and protects the long object is obtained.

In such a binding protective member, a wire inserted into the tubular protective cover is replaced. For the replacement, first, the male mount portion and the female mount portion of the tubular protective cover fitted together are separated from each other. As a result, the separation between the male mount portion and the female mount portion forms an opening in the protective cover in the longitudinal direction. Thus, a broken wire is replaced with a new wire through the opening in the protective cover. Subsequently, the male mount portion and the female mount portion separated from each other with the opening located therebetween in the protective cover are fitted together. As a result, the binding protective member returns to a state of the tubular member in which the protective cover protects the wires (long objects).

CITATION LIST

Patent Literature

Patent Literature 1: Japanese Laid-Open Patent Publication No. 2018-90290

SUMMARY OF INVENTION

Technical Problem

During replacement of the wire inserted into the tubular protective cover in the binding protective member, the male mount portion and the female mount portion of the protective cover fitted together are completely separated from each other over the entire protection cover in the longitudinal direction and then are fitted together again to be in the original fitted state over the entire protection cover in the longitudinal direction. To fit the male mount portion and the female mount portion that are separated from each other so as to enter the original fitted state over the entire protection cover in the longitudinal direction, one of ends of the male mount portion in the longitudinal direction and a corresponding one of ends of the female mount portion in the longitudinal direction need to be aligned and carefully positioned. This complicates the replacement of the wire (long object) inserted through the tubular protective cover.

Solution to Problem

An aspect of a long object guiding device that solves the above problem includes a long flexible tubular member and is configured to guide a flexible long object inserted through the tubular member while protecting, with the tubular member, the long object in correspondence with displacement of the tubular member. The tubular member has a long sheet shape in an unfolded state. A longitudinal direction of the tubular member intersects a width direction of the tubular member. A first joint portion is disposed on one side edge of the tubular member in the width direction to extend in the longitudinal direction. A second joint portion is disposed on an other side edge of the tubular member in the width direction to extend in the longitudinal direction. The second joint portion is configured to be joined to and disjoined from the first joint portion. At least one end of the tubular member in the longitudinal direction has a passage portion that allows for passage of an end of the long object.

A first aspect of a tubular member that solves the above problem is a long tubular member through which a flexible long object is insertable. The tubular member is flexible and has a long sheet shape in an unfolded state. A longitudinal direction of the tubular member intersects a width direction of the tubular member. A first joint portion is disposed on one side edge of the tubular member in the width direction to extend in the longitudinal direction. A second joint portion is disposed on an other side edge of the tubular member in the width direction to extend in the longitudinal direction. The second joint portion is configured to be joined to and disjoined from the first joint portion. At least one end of the tubular member in the longitudinal direction has a passage portion that allows for passage of an end of the long object.

A second aspect of a tubular member that solves the above problem is a long tubular member through which a flexible long object is insertable. The tubular member is flexible and has a long sheet shape in an unfolded state. A longitudinal direction of the tubular member intersects a width direction of the tubular member. A first joint portion is disposed on one side edge of the tubular member in the width direction to extend in the longitudinal direction. A second joint portion is disposed on an other side edge of the tubular member in the width direction to extend in the longitudinal direction. The second joint portion is configured to be joined to and disjoined from the first joint portion. At least one end of the tubular member in the longitudinal direction has a pattern serving as a reference for forming a passage portion that allows for passage of an end of the long object.

A third aspect of a tubular member that solves the above problem is a long tubular member through which a flexible long object is insertable. The tubular member is flexible and has a long sheet shape in an unfolded state. A longitudinal direction of the tubular member intersects a width direction of the tubular member. A first joint portion is disposed on one side edge of the tubular member in the width direction to extend in the longitudinal direction. A second joint portion is disposed on an other side edge of the tubular member in the width direction to extend in the longitudinal direction. The second joint portion is configured to be joined to and disjoined from the first joint portion. At least one end of the tubular member in the longitudinal direction has a hole serving as a reference for forming a passage portion that allows for passage of an end of the long object, the hole being located at a position spaced apart from an end edge of the end of the tubular member by a certain length in the longitudinal direction.

DESCRIPTION OF EMBODIMENTS

An embodiment of a long object guiding device and a tubular member disposed in the guiding device to protect the long object will now be described with reference to the drawings.

Figure 1:
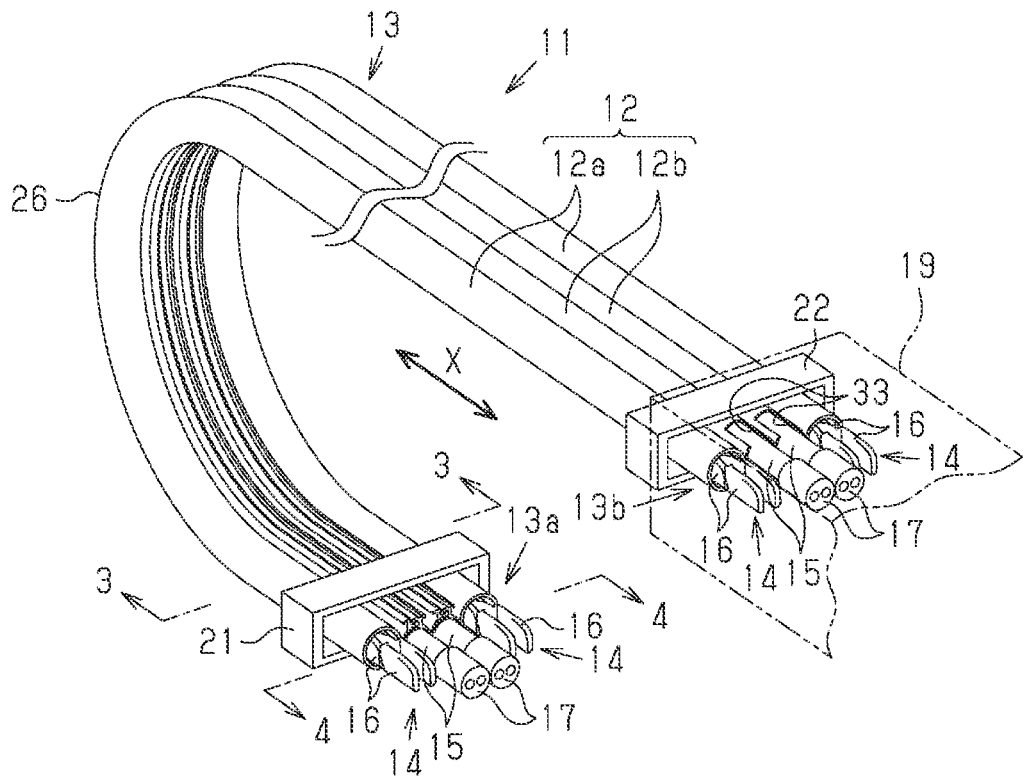
FIG. 1 is a perspective view schematically showing a long object guiding device according to an embodiment.

As shown in FIG. 1, a long object guiding device 11 includes a belt-shaped unit 13 having flexible tubular members 12. Each tubular member 12 is made of a synthetic resin and has a long cylindrical shape. In the present embodiment, the belt-shaped unit 13 includes four tubular members 12. Specifically, the four tubular members 12 are arranged side by side, and adjacent ones of the tubular members 12 are coupled together through welding so as to be integrated in a belt-shaped manner. Of the four tubular members 12, two tubular members 12a are located on opposite sides in the arrangement direction and respectively accommodate articulated support members 14 that are longer than the tubular members 12a. Of the four tubular members 12, two central tubular members 12b other than the tubular members 12a on the opposite sides respectively accommodate cables 15. The cables 15 are long objects that are longer than the tubular members 12b.

Each articulated support member 14 is a long member that includes link members 16 arranged in series. Adjacent ones of the link members 16 are pivotally coupled together. Each articulated support member 14 is allowed to bend toward a first side in a direction intersecting with the longitudinal direction (series arrangement direction) of the articulated support member 14 within a range up to a set bend radius, and is restricted from bending to a second side, which is opposite to the first side. In the present embodiment, when the belt-shaped unit 13 is bent in a semi-circular shape as shown in FIG. 1, the articulated support member 14 is allowed to bend toward the inner side and is restricted from bending toward the opposite (i.e., outer) side.

The outer diameter of the cable 15 is smaller than the inner diameter of the cable-covering tubular member 12b such that the cable 15 can be inserted through the cable-covering tubular member 12b. As shown in FIG. 1, a cylindrical connector member 17 is attached to each of the ends of the cable 15 protruding outward from the opposite ends of the cable-covering tubular member 12b. The connector members 17 have an outer diameter larger than the inner diameter of the cable-covering tubular member 12b. That is, in the long object guiding device 11 of the present embodiment, an intermediate portion of the cable 15 in the longitudinal direction is insertable into the cable-covering tubular member 12b, whereas the connector members 17 attached to the opposite ends of the cable 15 are not insertable into the cable-covering tubular member 12b.

Figure 2:
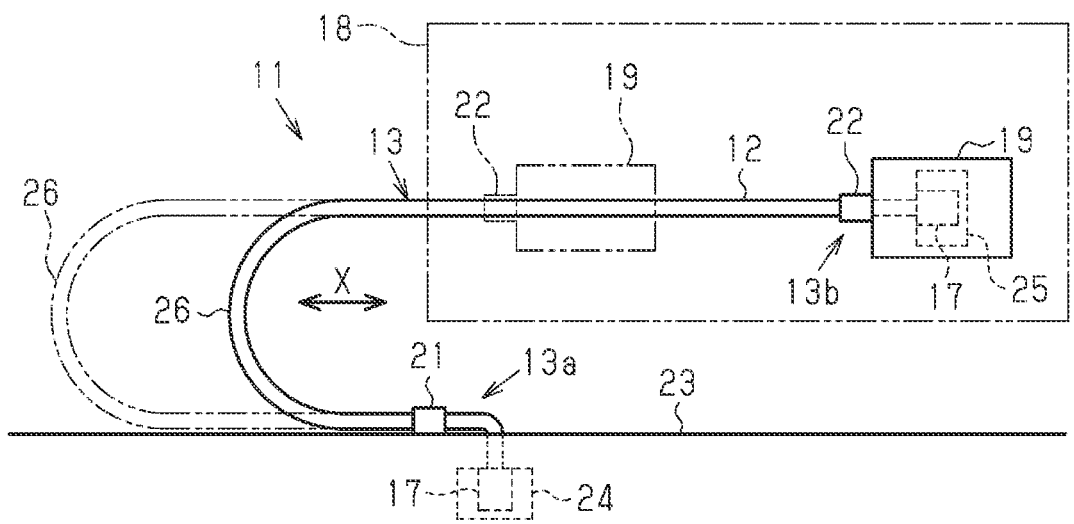
FIG. 2 is a schematic side view illustrating how the long object guiding device is used.

As shown in FIG. 2, the cables 15 are routed to supply power to a movable unit 19 included in equipment 18 (e.g., a machine tool), and the long object guiding device 11 is used to guide the cables 15 in correspondence with movement of the movable unit 19 while protecting the cables 15. The belt-shaped unit 13 includes a first end 13a and a second end 13b in its longitudinal direction. The first end 13a and the second end 13b are respectively clamped by a first clamp 21 and a second clamp 22. The first end 13a of the belt-shaped unit 13 clamped by the first clamp 21 is a fixed end. The second end 13b of the belt-shaped unit 13 clamped by the second clamp 22 is a movable end. The second end 13b, which is a movable end, moves in a movement direction X. The movement direction X corresponds to a direction in which the second end 13b guides the cable 15 while protecting the cable 15 with the tubular member 12b.

Specifically, the first end 13a of the belt-shaped unit 13 in its longitudinal direction is fixed by the first clamp 21 at a predetermined position on an installation surface 23 that extends in parallel with the movement direction X. The connector members 17 of the cables 15 respectively protruding from the ends of the cable-covering tubular members 12b at the first end 13a of the belt-shaped unit 13 are connected to a power source 24 in the installation surface 23. The second clamp 22 at the second end 13b of the belt-shaped unit 13 is fixed to the movable unit 19. The connector members 17 of the cables 15 respectively protruding from the ends of the protective tubular members 12b at the second end 13b of the belt-shaped unit 13 are connected to an electrical device 25 in the movable unit 19.

Figure 3:
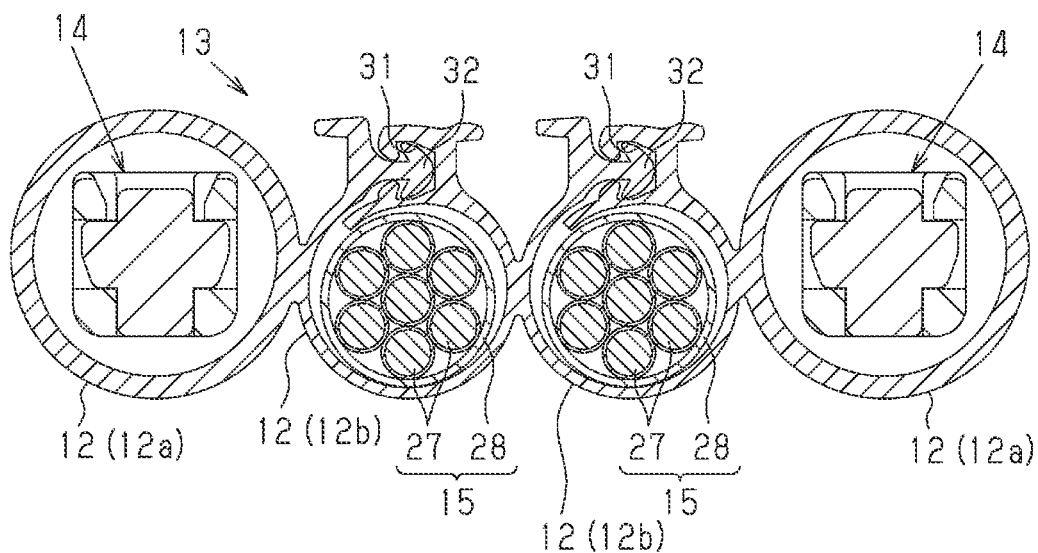
FIG. 3 is a cross-sectional view taken along line 3-3 in FIG. 1.
Figure 4:
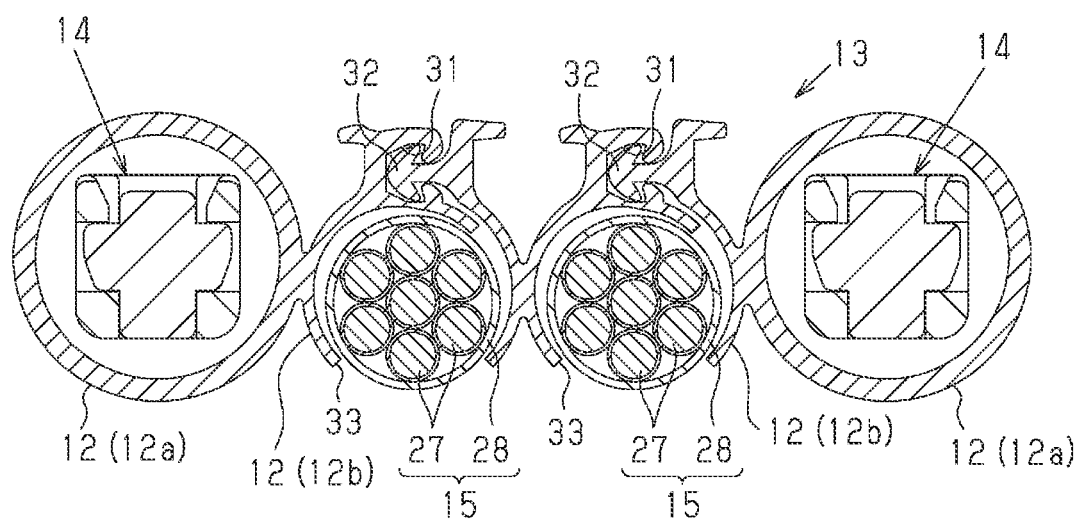
FIG. 4 is a cross-sectional view taken along line 4-4 in FIG. 1.

A bent portion 26 is disposed between the first end 13a and the second end 13b in the longitudinal direction of the belt-shaped unit 13. The bent portion 26 is shaped to be bent in a semicircular arc toward the side opposite to the second end 13b. The bent portion 26 is located farther from the second end 13b than from the first end 13a in the movement direction X of the movable unit 19. A part of the belt-shaped unit 13 in the longitudinal direction between the first end 13a and the bent portion 26 extends in a direction along the installation surface 23. A part of the belt-shaped unit 13 in the longitudinal direction between the second end 13b and the bent portion 26 is arranged at a height at which the movable unit 19 moves, and extends in parallel with the installation surface 23. As the second end 13b moves together with the movable unit 19, the bent portion 26 of the belt-shaped unit 13 is displaced in the movement direction X, FIGS. 3 and 4 each show the four tubular members 12a, 12b of the belt-shaped unit 13. Of the four tubular members 12a, 12b, the two tubular members 12a at the opposite ends in the arrangement direction have a larger outer diameter than the two tubular members 12b, which are located between the two tubular members 12a. In other words, among the four tubular members 12a and 12b of the belt-shaped unit 13, the cable-covering tubular members 12b through which the cables 15 are respectively inserted at positions other than the opposite ends in the arrangement direction have a smaller outer diameter than the tubular members 12a through which the articulated support member 14 are respectively inserted at the opposite ends in the arrangement direction. The cable 15 is formed by covering multiple (e.g., seven) bundled electric wires 27 with a long cylindrical insulator 28.

The cable-covering tubular member 12b through which the cable 15 is inserted will now be described.

Figure 5:
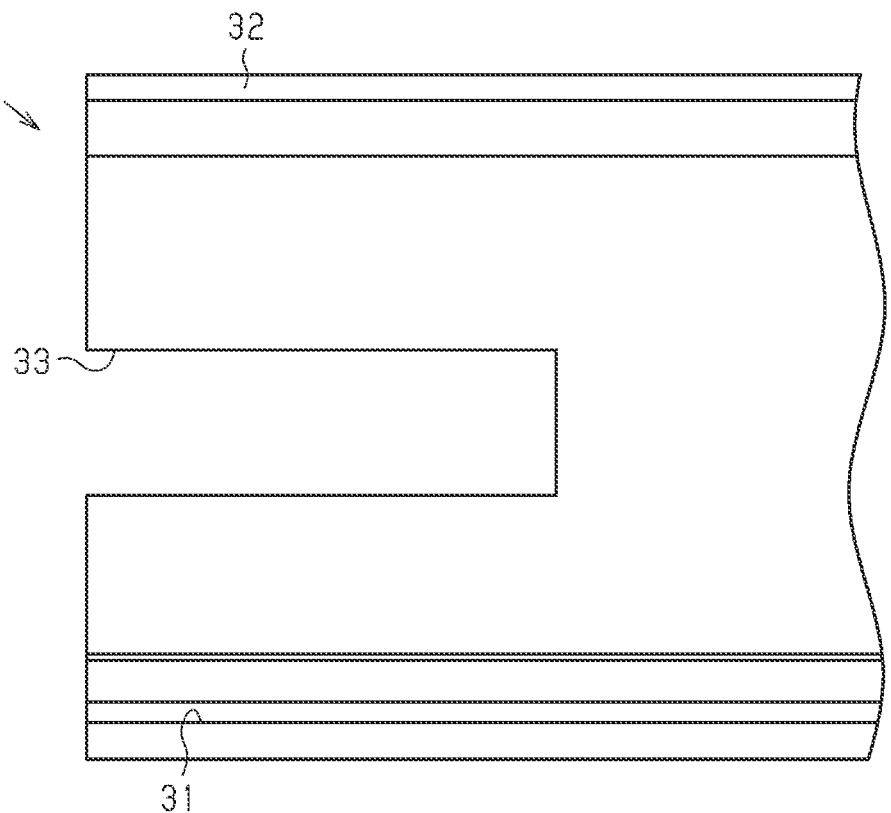
FIG. 5 is a plan view showing a section near the end of the tubular member where a passage portion is formed in the tubular member in an unfolded state.

As shown in FIG. 5, the cable-covering tubular member 12b has a long sheet shape in an unfolded state before being formed into a tubular shape. To facilitate understanding, FIGS. 5 to 7 and 9 to 11 each show only one tubular member 12b and do not show the other tubular members 12a, 12b, which are connected to that tubular member 12b through welding so as to be integrated into the belt-shaped unit 13.

A groove 31 extends in the longitudinal direction on one side edge of the tubular member 12b in its width direction that intersects the longitudinal direction. A protrusion 32 extends in the longitudinal direction on the other side edge of the tubular member 12b in the width direction. The groove 31 and the protrusion 32 are formed integrally with the protective tubular members 12b, which are made of synthetic resin, through extrusion. The groove 31 and the protrusion 32 can be mated with and unmated from each other. In the present embodiment, the groove 31 corresponds to a first joint portion, and the protrusion 32 corresponds to a second joint portion configured to be joined to and disjoined from the first joint portion.

When the tubular member 12b is deformed into a tubular shape from the unfolded state, the groove 31 and the protrusion 32 are located adjacent to each other in the circumferential direction of the tubular member 12b. Thus, when the cable-covering tubular member 12b is deformed into a tubular shape from the unfolded state so that the groove 31 and the protrusion 32 are fitted together over the entire tubular member 12b in the longitudinal direction, the cable-covering tubular member 12b is formed into a long cylindrical shape, i.e., a tubular shape, allowing insertion of the cable 15. In the present embodiment, the groove 31 and the protrusion 32 are located at a part of each protective tubular member 12b that is at the inner periphery of the bent portion 26.

The end of the cable-covering tubular member 12b in the longitudinal direction has a rectangular notch 33. The notch 33 is an example of a passage portion that allows the passage of the end of the cable 15. The notch 33 is formed by cutting out a certain region at the middle of the end of the tubular member 12b in the width direction from one end edge to the other end edge of the tubular member 12b in the longitudinal direction. As can be understood from the illustration of the second end 13b of the belt-shaped unit 13 in FIG. 1 and a circumferential surface portion of the tubular member 12b in FIG. 4, the notch 33 is located at a position opposite to the position where the groove 31 and the protrusion 32 are located in a radial direction of the tubular member 12b. The notch 33 is sized to allow passage of the connector member 17 at the end of the cable 15.

The operation of the present embodiment will now be described.

During the use of the long object guiding device 11, if breakage or the like occurs in the cable 15 accommodated in one of the protective tubular members 12B of the belt-shaped unit 13, the broken cable 15 needs to be replaced by a new cable 15. For the replacement, among the tubular members 12b through which the cables 15 are respectively inserted in the belt-shaped unit 13, the groove 31 and the protrusion 32 fitted together in the tubular member 12b that needs replacement of the cable 15 are separated from each other. If the groove 31 and the protrusion 32 fitted together are entirely separated from each other over the entire tubular member 12b in the longitudinal direction, re-fitting the groove 31 to the protrusion 32 in the original fitted state over the entire tubular member 12b becomes complicated. Accordingly, in the present embodiment, the groove 31 and the protrusion 32 fitted together are separated from each other as follows.

Figure 6:
FIG. 6 is a plan view showing a section near the end of the tubular member in which a portion other than the end having the passage portion is open.

As shown in FIG. 6, in such a case, in the present embodiment, the groove 31 and the protrusion 32 fitted together over the entire tubular member 12b in the longitudinal direction are kept inseparable from each other at the end of the tubular member 12b where the notch 33 is formed in the longitudinal direction. In other words, the groove 31 and the protrusion 32 in the tubular member 12b fitted together are configured to be separated from each other only at a part other than the end of the tubular member 12b where the notch 33 is formed in the longitudinal direction; that is, only at a predetermined length portion other than the end of the tubular member 12b in the longitudinal direction. As shown in FIG. 6, this configuration causes the predetermined length portion other than the end portion of the tubular member 12b in the longitudinal direction to have a substantially C-shaped cross-section. As a result, the separation between the groove 31 and the protrusion 32 causes the predetermined length portion to have an opening 34 in the longitudinal direction of the tubular member 12b.

As indicated by the dotted line in FIG. 6, it is preferred that a joint holding portion 35 be disposed at the end of the tubular member 12b. The joint holding portion 35 keeps the groove 31 and the protrusion 32 that are fitted (i.e., joined) together so as to be inseparable from each other at the end. If the joint holding portion 35 is located at the end of the tubular member 12b, the groove 31 and the protrusion 32 fitted together will not be separated from each other over the entire tubular member 12b in the longitudinal direction. In the present embodiment, the joint holding portion 35 is a bonding portion. The bonding portion bonds the groove 31 and the protrusion 32 together with adhesive so as to be inseparable from each other at a position near the end of the tubular member 12b.

Figure 7:
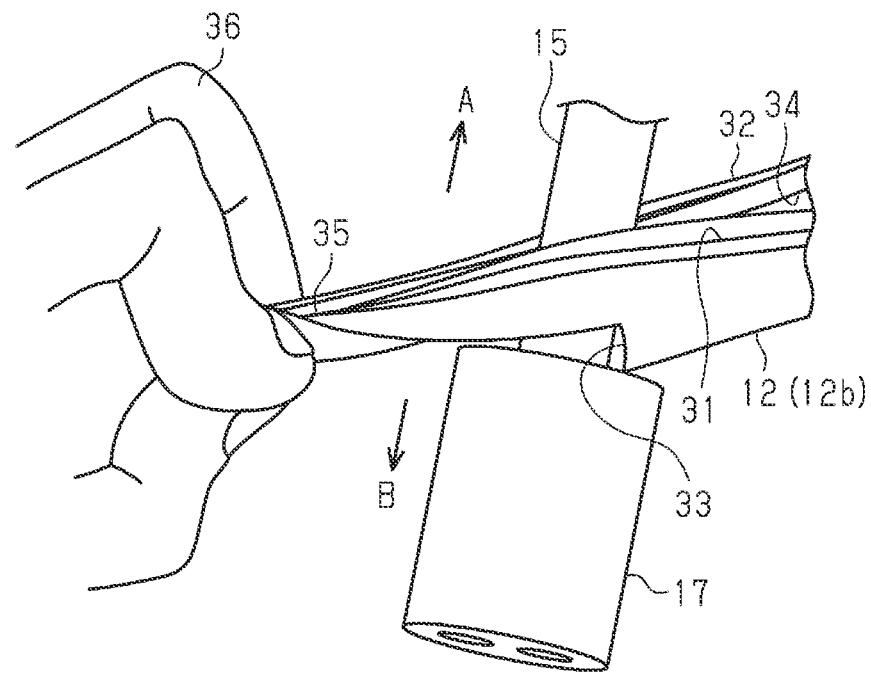
FIG. 7 is a perspective view showing the end of the long object passing through the passage portion of the end of the tubular member.
Figure 8:
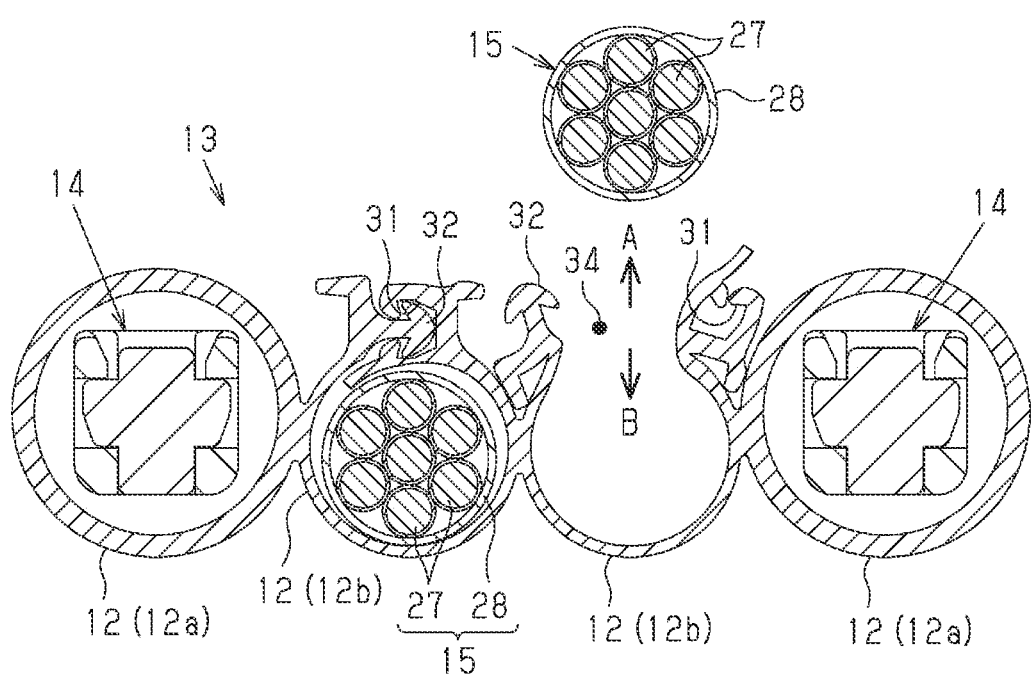
FIG. 8 is a cross-sectional view showing the long object being laterally accommodated through the opening in the tubular member.

As shown in FIGS. 7 and 8, after separation of the groove 31 and the protrusion 32 that have been fitted together at the predetermined length portion other than the end of the tubular member 12b, the broken cable 15 is replaced with a new cable 15. First, the broken cable 15 is taken out from the tubular member 12b held by a fingertip 36. In this case, as indicated by arrow A in FIG. 8, the intermediate portion of the entire cable 15 between opposite ends of the cable 15 is taken out from the tubular member 12b through the opening 34, which has been formed by the separation between the groove 31 and the protrusion 32.

In this state, the end of the entire cable 15 is still caught by the end of the tubular member 12b together with the connector member 17. Next, from this state, the end of the cable 15 is pulled out in the direction indicated by arrow A in FIG. 7 through the notch 33 together with the connector member 17 attached to that end. This causes the connector member 17 to pass through the notch 33 so as to expand a portion corresponding to an opening edge of the notch 33 in the tubular member 12b toward the inner side of the tubular member 12b. This completes the removal of the broken cable 15 from the tubular member 12b.

Subsequently, a new cable 15 is inserted into the tubular member 12b from which the broken cable 15 has been removed. In this case, the end of the entire new cable 15, together with the connector member 17 attached to that end, is first passed through the notch 33 at the end of the tubular member 12b in the direction indicated by arrow B in FIG. 7. From this state, as shown by arrow B in FIG. 8, the intermediate portion of the cable 15 between the opposite ends of the cable 15 is then accommodated in the tubular member 12b through the opening 34, which has been formed by the separation between the groove 31 and the protrusion 32.

Thereafter, at the predetermined length portion other than the end of the tubular member 12b in the longitudinal direction, the groove 31 and the protrusion 32 circumferentially facing each other across the opening 34 are re-fitted together over the entire tubular member 12b in the longitudinal direction. This completes the replacement of the broken cable 15 with a new cable 15 in the tubular member 12b. In this state, the groove 31 and the protrusion 32 fitted together are kept inseparable from each other at the end of the tubular member 12b where the notch 33 is formed. This eliminates the need for a troublesome task of aligning one of ends of the groove 31 in the longitudinal direction and a corresponding one of ends of the protrusion 32 in the longitudinal direction.

The advantages of the present embodiment will now be described.

(1) When the broken cable 15 is replaced with a new cable 15, the groove 31 and the protrusion 32 fitted together over the entire tubular member 12b in the longitudinal direction are separated from each other only at the predetermined length portion other than the end of the tubular member 12b, and are kept at the position near the end of the tubular member 12b. Thus, when the groove 31 and the protrusion 32 of the tubular member 12b are then fitted together over the entire original length in the longitudinal direction, a troublesome task of aligning and carefully positioning one of ends of the groove 31 in the longitudinal direction and a corresponding one of ends of the protrusion 32 in the longitudinal direction does not have to be performed.

(2) During replacement of the cable 15 inserted through the tubular member 12b, even if the connector member 17, sized so as not to be inserted through the tubular member 12b, is attached to the end of the cable 15, the connector member 17 can pass through the notch 33 at the end of the tubular member 12b. Thus, even if the groove 31 and the protrusion 32 of the tubular member 12b fitted together are not separated from each other over the entire tubular member 12b in the longitudinal direction, the cable 15 inserted through the tubular member 12b can be readily replaced.

(3) The joint holding portion 35 is disposed at the end of the tubular member 12b at which the notch 33 is formed in the longitudinal direction of the tubular member 12b. The joint holding portion 35 keeps the groove 31 and the protrusion 32 that are fitted together so as to be kept inseparable from each other by the. Accordingly, during replacement of the cable 15 from the tubular member 12b, the groove 31 and the protrusion 32 fitted together are prevented from being erroneously separated from each other over the entire tubular member 12b in the longitudinal direction.

(4) The passage portion, which allows for passage of the end of the cable 15 together with the connector member 17 at the end of the tubular member 12b, is formed by the notch 33 formed by cutting out a certain region from the end edge of the tubular member 12b in the longitudinal direction. Thus, the formation of the notch 33 in the end of the tubular member 12b facilitates the formation of the passage portion that allows for passage of the end of the cable 15 with the connector member 17.

The above embodiment may be modified as follows. The features included in the above embodiment and the features included in the following modifications can be combined. Also, the features included in the following modifications can be combined.

Figure 9:
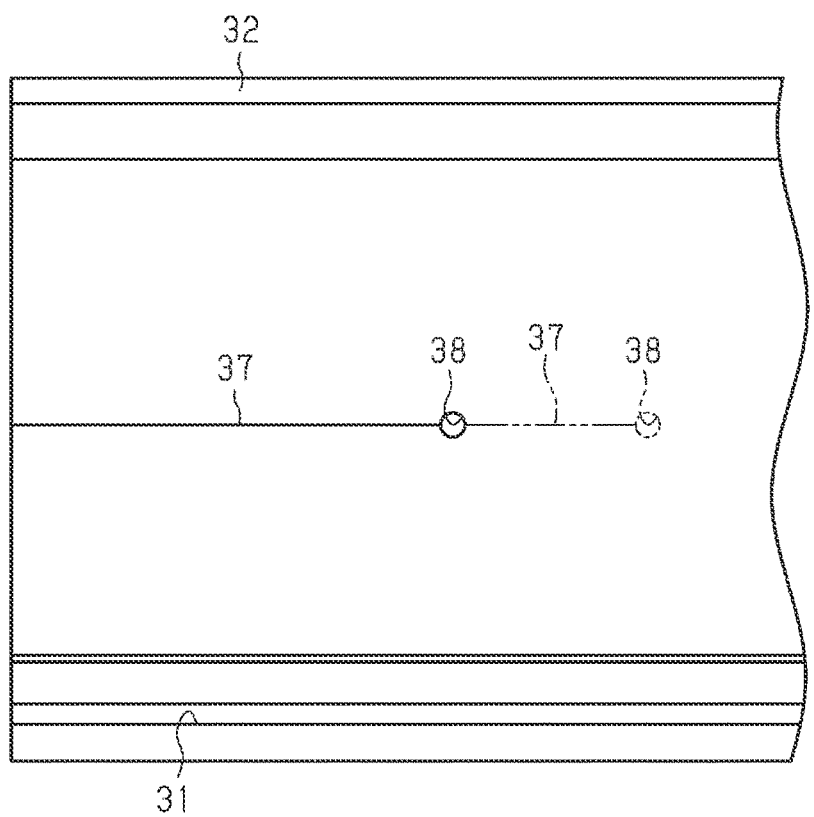
FIG. 9 is a plan view, with a part cut away, showing the tubular member in an unfolded state according to a first modification.

As in a first modification shown in FIG. 9, the passage portion formed at the end of the tubular member 12b may be a slit 37. The slit 37 is formed by cutting a portion having a certain length from one end edge toward the other end edge of the tubular member 12b in the longitudinal direction.

As shown in FIG. 9, it is preferable to provide a hole 38 in the end of the slit 37 on the side opposite to the end edge of the tubular member 12b. The hole 38 has a curved shape (e.g., circle or ellipse). The formation of the hole 38 reduces the possibility of the slit 37 being unnecessarily torn. The hole 38 does not have to be included. Instead, only a hole 38 may be formed in the end of the tubular member 12b at a position spaced a predetermined length from the end edge of the end in the longitudinal direction. Then, when the passage portion is required, the slit 37 from the end edge of the tubular member 12b to the hole 38 may be added later.

Figure 10:
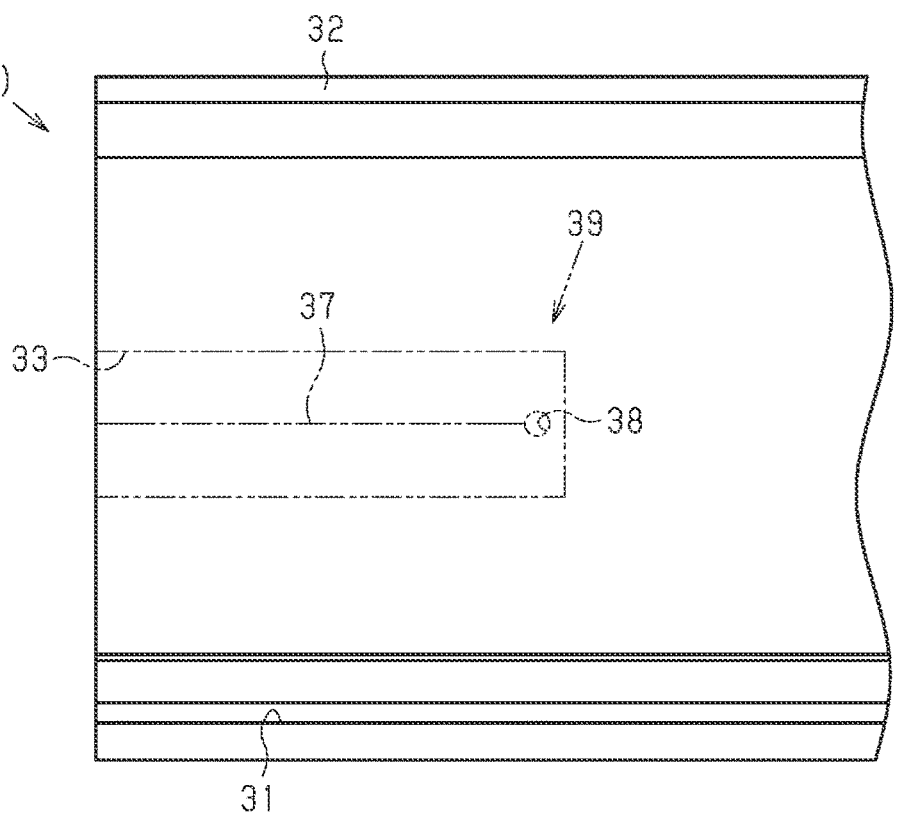
FIG. 10 is a plan view, with a part cut away, showing the tubular member in an unfolded state according to a second modification.

As in a second modification shown in FIG. 10, a pattern 39 may be drawn at the end of the tubular member 12b. The pattern 39 serves as a reference for forming the notch 33 or forming the slit 37 and the hole 38 in a certain region as the passage portion. This allows a user who uses the long object guiding device 11 with the tubular member 12b to form a passage portion in conformance with the pattern 39 as necessary. Instead of the pattern 39 in which all of the three elements (i.e., the notch 33, the slit 37, and the hole 38) are included as shown in FIG. 10, a pattern 39 in which at least one of the notch 33, the slit 37, and the hole 38 is drawn may be employed.

Figure 11:
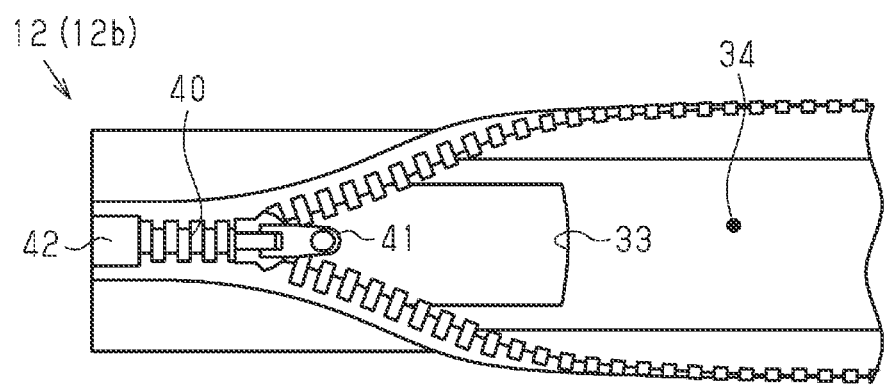
FIG. 11 is a plan view showing a section near the end in which the passage portion is formed in the tubular member according to a third modification.

As in a third modification shown in FIG. 11, a fastener 40 may be disposed on one side edge and the other side edge of the tubular member 12b to extend in the longitudinal direction, instead of the groove 31 and the protrusion 32. In this case, the tubular member 12b preferably has a stopper 42. The stopper 42 stops movement of the fastener 40 so as not to open the fastener 40 any more after a gripping piece 41, which moves while selectively opening and closing the fastener 40, moves to the end of the tubular member 12b where the notch 33 is formed. When the tubular member 12b includes the stopper 42, the gripping piece 41 is prevented from falling off from the end of the tubular member 12b and the fastener 40 is prevented from opening over the entire tubular member 12b in the longitudinal direction.

In the third modification shown in FIG. 11, the stopper 42 does not have to be fixed to the end of the fastener 40. Instead, the end of the fastener 40 may be sewn or fastened by a fixing bracket so as not to fully open the fastener 40.

In the second modification shown in FIG. 10, the pattern 39 may be illustrated by a color-coded picture or the like, instead of being drawn by a straight line or a curve.

In the first modification shown in FIG. 9, as additionally shown by the long dashed double-short dashed line in the drawing, an extension line that lengthens the slit 37, a line serving as a reference for forming a hole 38 that prevents tearing, or the like may be drawn on an extension line of the slit 37. This configuration allows the length of the slit 37 functioning as the passage portion to be adjusted depending on the difference in size of the connector member 17 at the end of the cable 15.

The joint holding portion 35 is not limited to the bonding portion with adhesive. Instead, the joint holding portion 35 may be formed by a sewn portion formed by sewing, a fixing portion formed by a stapler, or a caulking portion formed by caulking with a caulking metal fitting or the like.

The joint holding portion 35 may be omitted. In this case, when the groove 31 and the protrusion 32 fitted together over the entire tubular member 12b are separated from each other to replace the cable 15 in the tubular member 12b, the separation needs to be performed at only the predetermined length portion other than the end of the tubular member 12b in the longitudinal direction.

In the belt-shaped unit 13, the number of the cable-covering tubular members 12b through which the cables 15 are respectively inserted is not limited to two, and may be one or three or more.

In the belt-shaped unit 13, the tubular members 12 may only include the tubular members 12b through which the cables 15 are respectively inserted. In other words, the tubular members 12a through which the articulated support members 14 are respectively inserted may be omitted.

The passage portion formed by the notch 33 or the slit 37 may be disposed at each of the opposite ends of the tubular member 12b in the longitudinal direction, or may be disposed at only one of the ends. For example, if the connector member 17 attached to one of the ends of the cable 15 is sized to be insertable into the tubular member 12b, the passage portion may be disposed only at one of the ends of the tubular member 12b in the longitudinal direction.

The connector members 17 attached to the opposite ends of the cable 15 in the longitudinal direction may be sized to allow insertion of the connector members 17 through the tubular member 12b. Alternatively, the connector members 17 do not have to be attached to the opposite ends of the cable 15 in the longitudinal direction. In such a configuration, the cable 15 can be readily replaced by passing the end of the cable 15 through the passage portion at the end of the tubular member 12b. In this case, the groove 31 and the protrusion 32 fitted together do not have to be separated from each other over the entire tubular member 12b in the longitudinal direction during the replacement of the cable 15.

The first joint portion and the second joint portion are not limited to the groove 31 and the protrusion 32 mated with each other, respectively. Instead, the first joint portion and the second joint portion may be, for example, a hook-and-loop fastener which is provided in each of the end edges of the tubular member 12b overlapping each other in the circumferential direction and which can be joined in surface contact with each other.

Of the four tubular members 12a, 12b of the belt-shaped unit 13, the two tubular members 12a at the opposite ends in the arrangement direction may have a smaller outer diameter than the two tubular members 12b located between the two tubular members 12a. In other words, among the four tubular members 12a and 12b of the belt-shaped unit 13, the cable-covering tubular members 12b located at positions other than the opposite ends in the arrangement direction may have a larger outer diameter than the tubular members 12a through which the articulated support member 14 are respectively inserted at the opposite ends in the arrangement direction.

The invention claimed is:

1. A long object guiding device comprising a long flexible tubular member and being configured to guide a flexible long object inserted through the tubular member while protecting, with the tubular member, the long object in correspondence with displacement of the tubular member, wherein
   the tubular member has a long sheet shape in an unfolded state,
   a longitudinal direction of the tubular member intersects a width direction of the tubular member,
   a first joint portion is disposed on one side edge of the tubular member in the width direction to extend in the longitudinal direction,
   a second joint portion is disposed on an other side edge of the tubular member in the width direction to extend in the longitudinal direction, the second joint portion being configured to be joined to and disjoined from the first joint portion,
   at least one end of the tubular member in the longitudinal direction has a passage portion that allows for passage of an end of the long object, and
   the passage portion is a notch formed by cutting out a certain region from an end edge of the tubular member in the longitudinal direction or a slit formed by cutting a portion having a certain length from the end edge.

2. The long object guiding device according to claim 1, wherein a joint holding portion is disposed at the end of the tubular member having the passage portion, the joint holding portion keeping the first joint portion and the second joint portion that are joined together so as to be inseparable from each other.

3. A long tubular member through which a flexible long object is insertable, wherein
   the tubular member is flexible and has a long sheet shape in an unfolded state,
   a longitudinal direction of the tubular member intersects a width direction of the tubular member,
   a first joint portion is disposed on one side edge of the tubular member in the width direction to extend in the longitudinal direction,
   a second joint portion is disposed on an other side edge of the tubular member in the width direction to extend in the longitudinal direction, the second joint portion being configured to be joined to and disjoined from the first joint portion,
   at least one end of the tubular member in the longitudinal direction has a passage portion that allows for passage of an end of the long object, and
   the passage portion is a notch formed by cutting out a certain region from an end edge of the tubular member in the longitudinal direction or a slit formed by cutting a portion having a certain length from the end edge.

4. A long tubular member through which a flexible long object is insertable, wherein
   the tubular member is flexible and has a long sheet shape in an unfolded state,
   a longitudinal direction of the tubular member intersects a width direction of the tubular member, a first joint portion is disposed on one side edge of the tubular member in the width direction to extend in the longitudinal direction, a second joint portion is disposed on an other side edge of the tubular member in the width direction to extend in the longitudinal direction, the second joint portion being configured to be joined to and disjoined from the first joint portion, at least one end of the tubular member in the longitudinal direction has a pattern serving as a reference for forming a passage portion that allows for passage of an end of the long object, and in the tubular member in the unfolded state, the pattern is shorter than the tubular member in the longitudinal direction.

5. The long tubular member according to claim 4, wherein the passage portion is a notch formed by cutting out a certain region from an end edge of the tubular member in the longitudinal direction or a slit formed by cutting a portion having a certain length from the end edge, and the pattern is a pattern in which at least one of the notch and the slit is drawn.

6. A long tubular member through which a flexible long object is insertable, wherein the tubular member is flexible and has a long sheet shape in an unfolded state, a longitudinal direction of the tubular member intersects a width direction of the tubular member, a first joint portion is disposed on one side edge of the tubular member in the width direction to extend in the longitudinal direction, a second joint portion is disposed on an other side edge of the tubular member in the width direction to extend in the longitudinal direction, the second joint portion being configured to be joined to and disjoined from the first joint portion, and at least one end of the tubular member in the longitudinal direction has a hole serving as a reference for forming a passage portion that allows for passage of an end of the long object, the hole being located at a position spaced apart from an end edge of the end of the tubular member by a certain length in the longitudinal direction.

* * * * *